United States Patent
Volkmann et al.

[11] Patent Number: 5,791,616
[45] Date of Patent: Aug. 11, 1998

[54] HOLDER FOR TWO DRINK CONTAINERS, ESPECIALLY FOR A MOTOR VEHICLE

[75] Inventors: Tilo Volkmann, Sindelfingen; Christina Nestler, Ostelsheim; Hans-Jürgen Körber, Sindelfingen; Bernd Plocher, Rottenburg-Seebronn, all of Germany

[73] Assignees: fischerwerke Artur Fischer GmbH & Co. KG, Waldachtal; Mercedes Benz AG, Stuttgart, both of Germany

[21] Appl. No.: 681,848

[22] Filed: Jul. 29, 1996

[30] Foreign Application Priority Data

Aug. 3, 1995 [DE] Germany ............ 195 28 488.7

[51] Int. Cl.⁶ ........................................... A47C 7/62
[52] U.S. Cl. .................... 248/311.2; 297/188.01; 297/188.07; 297/188.15; 297/188.16; 297/188.17; 297/188.19; 224/926
[58] Field of Search ............... 248/311.2; 224/281, 224/282, 926; 297/188.01, 188.07, 188.1, 188.11, 188.15, 188, 16, 188.17, 188.19

[56] References Cited

U.S. PATENT DOCUMENTS

| | | | |
|---|---|---|---|
| 5,060,899 | 10/1991 | Lorence et al. | 297/188.01 X |
| 5,330,146 | 7/1994 | Spykerman | 297/188.17 X |
| 5,489,054 | 2/1996 | Schiff | 248/311.2 X |
| 5,601,269 | 2/1997 | Jankovic | 297/188.17 X |
| 5,620,228 | 4/1997 | Ito et al. | 297/188.17 |
| 5,634,621 | 6/1997 | Jankovic | 297/188.17 X |
| 5,660,433 | 8/1997 | Bruknke et al. | 297/188.17 |
| 5,673,890 | 10/1997 | Duesterberg | 297/188.16 X |
| 5,673,891 | 10/1997 | Fujihara et al. | 297/188.17 X |

Primary Examiner—James R. Brittain
Assistant Examiner—Rodney B. White
Attorney, Agent, or Firm—Michael J. Striker

[57] ABSTRACT

The retractable holder for two drink containers, for example, in a dashboard of a motor vehicle, includes a slide element (16) provided with an insertion opening (38) for a first drink container. With the slide element (16) pulled out, a swiveling part (42) provided with an insertion opening (46) for a second drink container can be swiveled sideways out of the slide element (16). So that the holder can be reduced in width, the two insertion openings (38, 46) are open along one section of their circumference. When the swiveling part (42) is accommodated in the slide element (16), the open section is completed by or circumferentially closed by a swiveling arm (40) that is mounted on the swiveling part (42), which swiveling arm (40) swivels out sideways. When the swiveling part(42) is pivoted out from the slide element (16), the swiveling arm (40) completes the insertion opening (46) of the swiveling part (42) and an outer rim (52) of the swiveling part (42) completes the insertion opening (38) of the slide element (16). In order to be able to reduce also the overall height of the holder, preferred embodiments include a helical drive (58) that lowers a support (54) that swivels together with the swiveling part (42) as the latter is swiveled out.

11 Claims, 2 Drawing Sheets

HOLDER FOR TWO DRINK CONTAINERS, ESPECIALLY FOR A MOTOR VEHICLE

BACKGROUND OF THE INVENTION

The invention relates to a holder for two drink containers that is provided for installation in a dashboard, armrest or the like of a motor vehicle.

This drink holder is based on a known holder having a slide element that can be pulled out in the same manner as a drawer, which has an insertion opening and, located underneath and spaced from this insertion opening, a standing base for one drink container. The slide element has a swiveling part that can be swiveled sideways out of the slide element which also has an insertion opening and, located underneath and spaced from the insertion opening, a standing surface for another drink container. The two insertion openings are coincident and superposed on one another when the swiveling part is swiveled into the slide element.

A known holder of this type is described in U.S. Pat. No. 5,060,899. This known holder has a slide element that can be pulled out in the manner of a drawer and that has an opening for the insertion of one drink container. A base of the slide element forms at the same time a base for the one drink container to stand on. One side of the slide element is open. Mounted on the slide element is a swiveling part that can be swiveled out of the slide element on the open side thereof. The swiveling part has an opening for insertion of a second drink container, a base of the swiveling part forming a surface for the second drink container to stand on. Accordingly, two drink containers, such as drink cans or coffee cups, can be inserted into the holder. If only one drink container is to be inserted into the known holder, the swiveling part can remain in a position in which it is swiveled into the slide element, in which position it is locked by a locking device. The swiveling part is then located coincident with and underneath the insertion opening of the slide element. The diameter of the drink container that is to be inserted together with an adequate wall on both sides of the insertion opening dictate the minimum structural width of the slide element of the known holder.

SUMMARY OF THE INVENTION

It is an object of the present invention to provide a holder for drink containers, especially for a motor vehicle, which is narrower than the known holders for drink containers, and especially to provide a holder for drink containers having a slide element having a width which is less than the diameter of the two insertion openings, so as to reduce the space required for the holder and its installation.

This object and others which will become more apparent herein in after are attained in a holder for drink containers, especially for a motor vehicle, comprising a slide element that can be pulled out like a drawer, which is provided with an insertion opening and, located underneath and spaced from this insertion opening, a standing base for one drink container, the slide element having a swiveling part pivotally mounted so as to be pivotable into and out of the slide element, the swiveling part also having an insertion opening and, located underneath and spaced from the insertion opening, a standing surface for another drink container. The two insertion openings are coincident and superposed on one another when the swiveling part is pivoted into and accommodated in the slide element.

According to the invention, the two insertion openings engage only partly around the drink containers inserted therein, the holder has a swiveling arm that can be swiveled out on the same side as the swiveling part to complete the insertion opening of the slide element with the swiveling part swiveled in and, with the swiveling part swiveled out, completes the insertion opening thereof, and, with the swiveling part swiveled out, an outer rim of the swiveling part completes the insertion opening of the slide element.

In the holder according to the invention, the insertion opening of the slide element is of incomplete construction, that is to say one section of the circumference is missing on the side on which the swiveling part can be swiveled out of the slide element. With the slide element pulled out, the insertion opening is completed by a swiveling arm that can be swiveled out sideways in the same direction as the swiveling part. As a result, the slide element can be constructed to be narrower than the diameter of its insertion opening.

If two drink containers are to be inserted into the holder according to the invention, the swiveling part is swiveled sideways out of the slide element. The swiveling arm, which, in a preferred construction of the invention, is swivel-mounted on the swiveling part, swivels with the latter out of the slide element and completes the insertion opening thereof. A section of an outer rim of the swiveling part completes the insertion opening of the slide element. A drink container inserted in the slide element rests on the base thereof. A drink container inserted in the insertion opening of the swiveling part rests on a standing surface that swivels together with the swiveling part.

In order to reduce also the required overall height of the holder according to the invention, the holder is constructed according to one embodiment so that a support that swivels together with the swiveling part is lowered as the swiveling part swivels out and is raised again as the swiveling part swivels in. The support includes the standing surface for the second drink container to be inserted in the insertion opening of the swiveling part. In that manner, a sufficient vertical distance between the standing surface and the insertion opening is obtained so that an inserted drink container is held securely. With the swiveling part swiveled in, the support is located in a recess of the standing base of the slide element. The support does not project downwards beyond the base of the slide element and thus does not increase the overall height of the holder.

The lowering and raising of the support is carried out in a embodiment according to the invention by a helical drive.

In preferred embodiments of the invention, the swiveling part is locked by locking devices in a position in which it is swiveled into the slide element and/or the slide element is locked in its pushed-in position. The movement of the slide element outwards and/or the swiveling of the swiveling part and/or of the swiveling arm outwards is carried out preferably using spring elements.

To improve the hold on an inserted drink container, in one embodiment of the invention the insertion openings are provided with contact flaps that are urged by spring action into the insertion openings and as a result bear against drink containers inserted therein in at least two sections, opposite one another, of the insertion opening in question.

BRIEF DESCRIPTION OF THE DRAWING

The present invention is explained hereinafter in greater detail with reference to an embodiment illustrated in the drawing, in which.

DESCRIPTION OF THE PREFERRED EMBODIMENT

Figure 1:
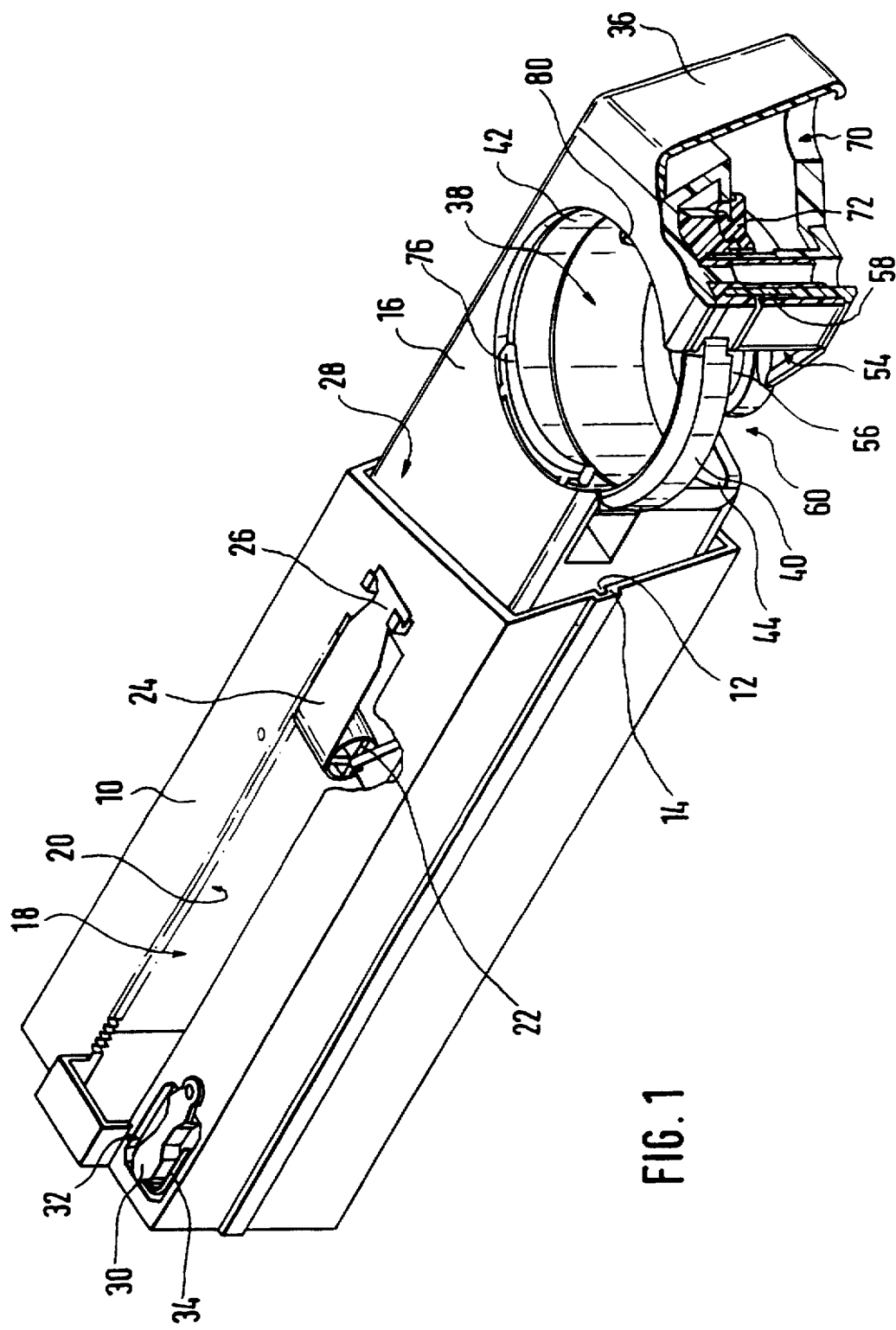
FIG. 1 is partially cutaway perspective view of a holder according to the invention with the slide element pulled out.

The holder according to the invention for two drink containers that is shown in the drawing has a box-shaped housing 10, the front side of which is open. That housing 10 has guide grooves 12 on both inner sides, which guide grooves extend from the rear to the front and in which there engage guide ribs 14 projecting laterally outwards from a slide element 16. The slide element 16 is mounted in the housing 10 by way of those straight-motion guides 12, 14 so that it can be pulled out in the manner of a drawer. The open front side of the housing 10 forms an opening 28 through which the slide element 16 is pulled out.

In its upper side, the housing 10 has a straight opening 18 that extends from the rear almost to the front, one side rim of which opening is provided with a tooth profile 20. Rotatably mounted on the upper rear end of the slide element 16 is a roller 22 of a coil spring 24. An unwound end 26 of the coil spring 24 is attached to the top of the housing 10 near the pull-out opening 28 thereof. The coil spring 24 winds itself up and moves the slide element 16 into the pulled-out position illustrated in the drawing.

To hold the slide element 16 in the position in which it is pushed into the housing 10, the holder according to the invention has a locking device, known, per se, that has a heart-shaped curved part 30. That part 30 is arranged pivotably in an opening 32 of the housing 10, which opening is located to one side on the upper face of the rear end of the housing 10. The heart-shaped curved part 30 is held in its middle position by a spring 34. A locking pin, not visible in the drawing, on the upper side of the slide element 16 engages with the heart-shaped curved part 30 as the slide element 16 is pushed in and locks the slide element 16. When the slide element 16 is pressed a little way into the housing 10 by pressure on a panel 36 on the front side of the slide element, the locking pin is released from the heart-shaped curved part 30 and the coil spring 24 moves the slide element 16 into the pulled-out position.

A toothed wheel of a rotary fluid damper, not visible in the drawing, that is known per se and is mounted on the upper side of the slide element 16 meshes with the toothing 20 of the housing 10 and damps the displacement movement of the slide element 16.

In the front region of its upper side, the slide element 16 of the holder according to the invention has a circular insertion opening 38 for a drink container, not shown, for example a drink can or a cup. The insertion opening 38 is not, however, in the form of a continuous full circle; one section of the circumference is missing on one side of the slide element 16. In that manner, the slide element 16 can be constructed to be as narrow as or narrower than the diameter of the insertion opening 38.

With the slide element 16 in the pulled-out position, its insertion opening 38 is completed by a swiveling arm 40. The swiveling arm 40 is swivel-mounted on a swiveling part 42 that is in turn swivelably attached to the slide element 16. A helical torsion spring, not visible in the drawing, urges the swiveling arm 40 sideways out of the slide element 16 into a position in which it completes the insertion opening 38 of the slide element to make a full circle (FIG. 1). In that position, a drink container can be inserted into the holder according to the invention. The drink container rests on a standing base 44 that is integral with the slide element 16.

As the slide element 16 is pushed into the housing 10, the swiveling arm 40 comes to bear against one side wall of the housing 10 and is urged inwards by that side wall so that it does not project sideways beyond the slide element 16.

Figure 2:
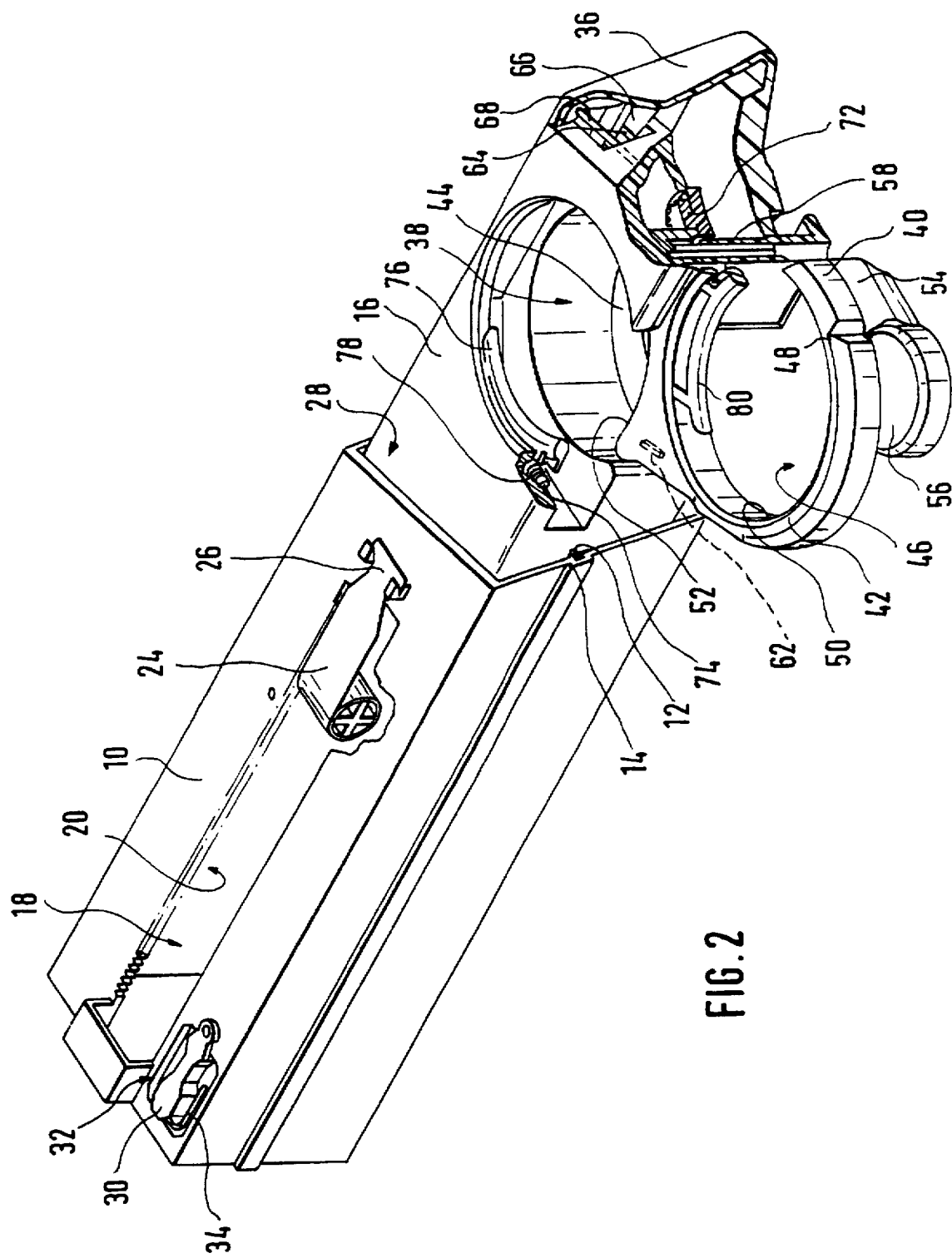
FIG. 2 is another perspective view of the apparatus shown in FIG. 1 but additionally with a swiveling part swiveled sideways out of the slide element.

If a second drink container is to be inserted into the holder according to the invention, the swiveling part 42 can be swiveled out of the slide element 16 on the same side as the swiveling arm 40 (FIG. 2). The swiveling part 42 has a second insertion opening 46. With the swiveling part 42 swiveled into the slide element 16, that insertion opening 46 is located coincident with and underneath the insertion opening 38 of the slide element 16. The insertion opening 46 of the swiveling part 42 is also incomplete, like the insertion opening 38 of the slide element; it likewise lacks one section of its circumference, which is completed by the swiveling arm 40 that swivels together with the swiveling part 42.

On its free end, the swiveling arm 40 that is swivel mounted on the swiveling part 42 has a nose 48 with which it is urged from inside by its helical torsion spring against a wall 50 of the swiveling part 42, which wall 50 forms the insertion opening 46, thus completing the insertion opening 46 of the swiveling part 42. With the swiveling part 42 swiveled into the slide element 16, the swiveling arm 40 thus completes both the insertion opening 38 of the slide element 16 and the insertion opening 46 of the swiveling part 42, which insertion opening 46 is, in that position, coincident with the insertion opening 38.

With the swiveling part 42 swiveled sideways out of the slide element 16, a circular arc-shaped outer rim 52 of the swiveling part 42 completes the insertion opening 38 of the slide element 16 so that a drink container that is inserted in the slide element 16 is encircled completely or at least virtually completely.

A support 54 that swivels together with the swiveling part 42 is connected with the swiveling part 42 so as to prevent rotation of support 54 relative to the swiveling part 42. The support 54 has a standing surface 56 for a drink container inserted in the insertion opening 46 of the swiveling part 42. The standing surface 56 is located centrally beneath, and vertically spaced from, the insertion opening 46 of the swiveling part 42.

The support 54 is mounted on the slide element 16 to swivel about the same axis as the swiveling part 42. The slide element 16 has a helical drive 58 for the support 54, which lowers the support 54 as it is swiveled out. As a result, the vertical distance between the standing surface 56 and the insertion opening 46 is increased in order to provide a secure hold on an inserted drink container combined with a low overall height of the slide element 16.

As the swiveling part 42 is swiveled into the slide element 16, the helical drive 58 raises the support 54 again. The support is taken up into an opening 60 (FIG. 1), open at the side, of the standing base 44 of the slide element 16. In the swiveled-in position, the support 54 does not project downwards out of the slide element 16.

To lock the swiveling part 42 in the position in which it is swiveled into the slide element 16, the swiveling part 42 has a recess 62 on its underside, in which recess a locking lug 64 (FIG. 2) engages when the swiveling part 42 is swiveled in. That locking lug 64 is integral with a lever 66 that extends inwards from the panel 36 in the side region of the slide element 16. By pulling on the underside of the panel 36, the swiveling part 42 is unlocked and swivels outwards under spring action. For that purpose, the panel 36 is pivotable about a pivot shaft 68 that is located on the upper front side of the slide element 16. An opening 70 on the underside of the slide element 16 at the front enables the panel 36 to be grasped from the back and from beneath with one or two fingers in order to pull the panel 36 forwards to unlock the swiveling part 42.

A second rotary fluid damper element 72 is mounted on the slide element 16. The toothed wheel of that damper element 72 meshes with a toothed segment, not visible in the drawing, of the swiveling part 42 and damps its swiveling movement. on the slide element 16 a contact flap 76 which projects into the insertion opening 38 is arranged to be pivotable about two pivot pins 74. Two helical torsion springs 78 that are mounted on the pivot pins 74 urge the flap 76 from the outside and from below in an arc about the pivot pins 74 upwards and inwards into the insertion opening 38. The contact flap 76 presses an inserted drink container against the opposite side of the insertion opening 38 and as a result improves the hold on the drink container in the holder according to the invention. A similar contact flap 80 is mounted on the swiveling part 42 to project into the insertion opening 46 of the swiveling part 42.

What is claimed is:

1. A holder for two drink containers, said holder comprising a slide element (16) movable between a pushed-in position and a pulled-out position and provided with an insertion opening (38) for insertion of one of the two drink containers and a standing base (44) located underneath and spaced from the insertion opening (38) for supporting the one of the drink containers inserted in the insertion opening (38);

a swiveling part (42) pivotally mounted in the slide element (16) so that said swiveling part (42) can be swiveled between a swiveled-in position in the slide element (16) and a swiveled-out position, said swiveling part being provided with an insertion opening (46) for one of the two drink containers; and a support (54) provided with a standing surface (56) for the one of the two drink containers inserted in the insertion opening (46) of the swiveling part (42), said insertion opening (46) of the swiveling part (42) being coincident with the insertion opening (38) of the slide element (16) when the swiveling part (42) is in the swiveled-in position and extending only partially circumferentially around the one of the drink containers inserted therein;

a pivotally mounted swiveling arm (40) on a side of the slide element (16) on which said swiveling part (42) is pivotally mounted, said swiveling arm (40) being pivotable into a position completing and circumferentially closing the insertion opening (38) of the slide element (16) when the swiveling part (42) is moved into the swiveled-in position, and said swiveling arm (40) completing and circumferentially closing the insertion opening (46) of the swiveling part (42) and an outer rim (52) of the swiveling part (42) completing and circumferentially closing the insertion opening (38) of the slide element (16) when the swiveling part (42) is pivoted into the swiveled-out position.

2. The holder according to claim 1, wherein the swiveling arm (40) is pivotably mounted on the swiveling part (42).

3. The holder according to claim 1, wherein the swiveling part (42) has a support (54) nonrotatably mounted on the swiveling part (42), said support (54) having a standing surface (56) for the one of the drink containers inserted in the insertion opening (46) of the swiveling part (42), and further comprising means for lowering said support (54) and thus said standing surface (56) relative to said swiveling part (42), when said swiveling part (42) swivels outwards from the slide element (16), and means for swiveling the support (54) upward and into an opening (60) provided in a standing base (44) of the slide element (16).

4. The holder according to claim 3, wherein said means for lowering said support and swiveling said support upward comprises a helical drive (58) formed so that said helical drive (58) lowers the support (54) as the swiveling part (42) swivels out and raises the support (54) as the swiveling part (42) swivels into the opening (60).

5. The holder according to claim 1, further comprising a locking device (30) for locking the slide element (16) in said pushed-in position and a spring element (24) for moving the slide element (16) into said pulled-out position.

6. The holder according to claim 1, further comprising a locking device (62, 64) for locking said swiveling part (42) in said swiveled-in position.

7. The holder according to claim 6, further comprising a spring element for swiveling the swiveling part (42) out into the swiveled out position and/or a spring element for swiveling the swiveling arm (40) out.

8. The holder according to claim 1, further comprising a contact flap (76) provided in the slide element (16) and means for urging said contact flap into said insertion opening (38) to secure one of the drink containers.

9. The holder according to claim 8, wherein the means for urging said contact flap comprises a spring element (74).

10. The holder according to claim 1, further comprising a contact flap (80) provided in the swiveling part (42) and means for urging said contact flap (80) into said insertion opening (46) to secure one of the drink containers.

11. The holder according to claim 10, wherein the means for urging said contact flap comprises a spring element (74).

* * * * *